Patented Dec. 17, 1929

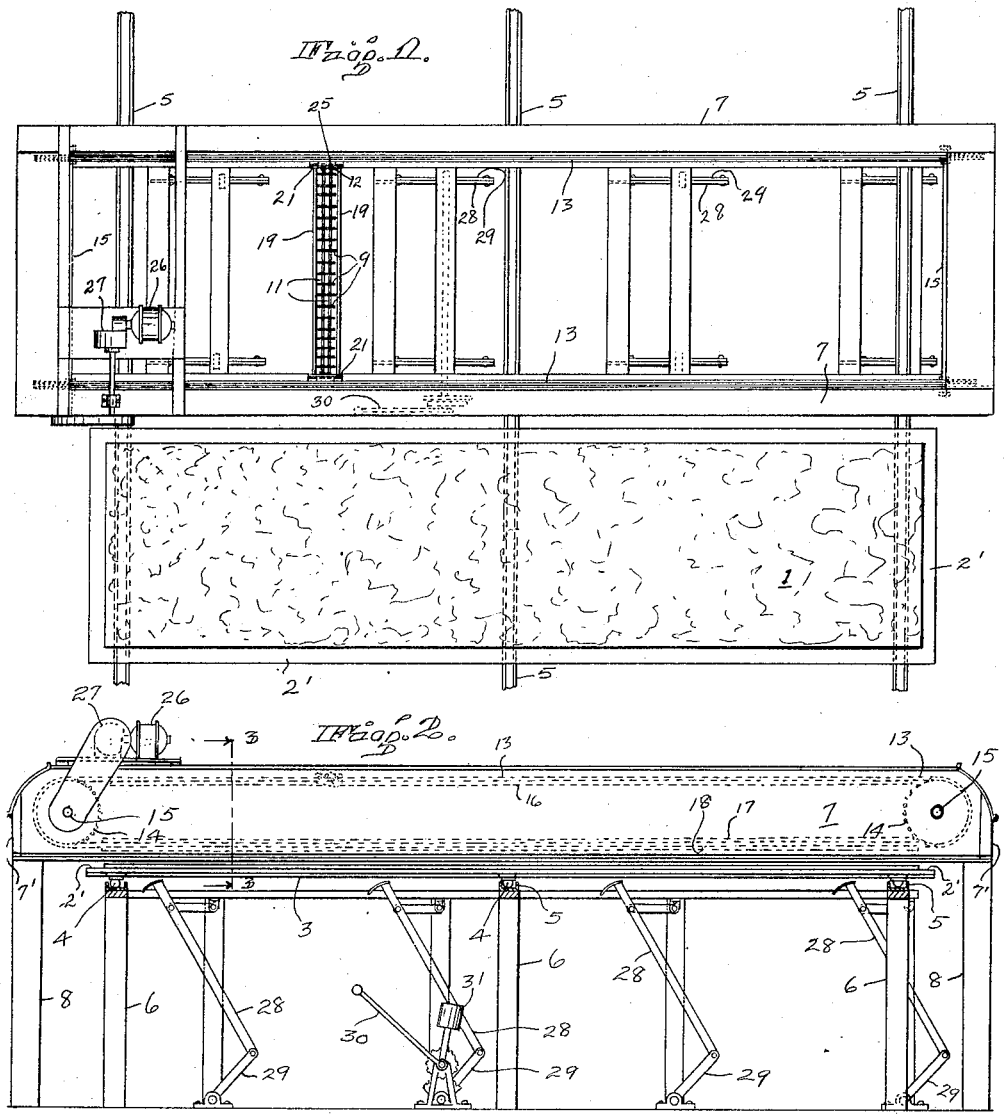

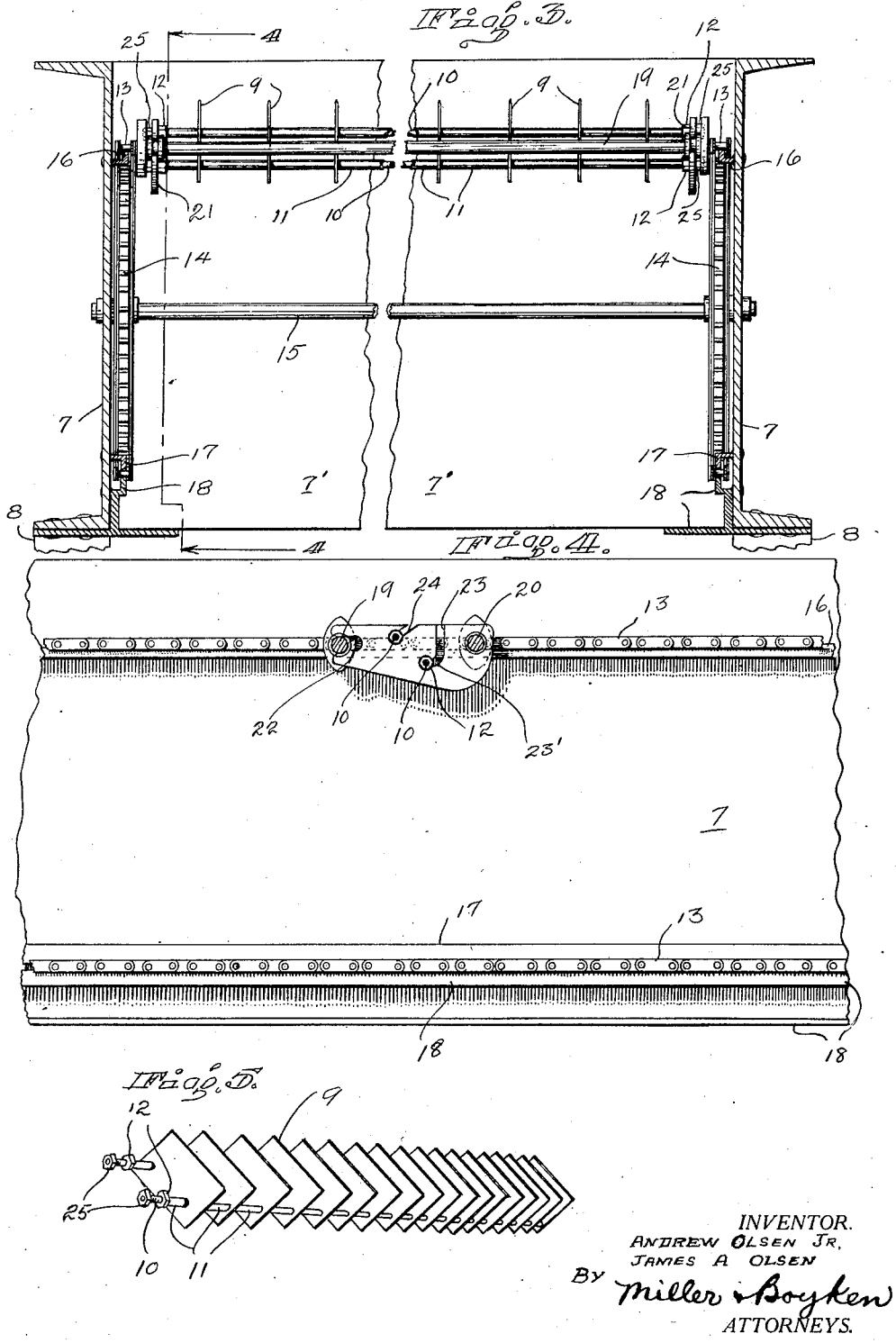

1,740,111

UNITED STATES PATENT OFFICE

ANDREW OLSEN, JR., AND JAMES A. OLSEN, OF SAN FRANCISCO, CALIFORNIA, ASSIGNORS TO GOLDEN NUGGET SWEETS, OF SAN FRANCISCO, CALIFORNIA, A FIRM

CANDY-CUTTING MACHINE

Application filed July 18, 1928. Serial No. 293,756.

This invention relates to apparatus for cutting large slabs of candy in the wholesale manufacture of the same and has for its objects improvements in such apparatus whereby successive slabs of candy may be quickly cut or scored and passed on for further handling.

In the drawings accompanying this application Fig. 1 is a plan view of our candy slab cutting machine with a slab of candy on a rollable board in position for rolling under the machine for cutting and showing the tracks extending beyond the machine for rolling the slab past the machine after cutting.

Fig. 2 is an elevation of Fig. 1 showing the mechanism for raising and clamping the board carrying the candy slab against the bottom of the machine to position the slab accurately relative to the knives for cutting.

Fig. 3 is an enlarged cross section of the machine taken along the line 3—3 of Fig. 2 showing the gang knives mounted on the chain carrier by which they are dragged over the candy.

Fig. 4 is a cross section of Fig. 3 taken along the line 4—4 thereof.

Fig. 5 is a detached view of the knives of Fig. 4 mounted on their spacing bars.

In further detail 1 is a long slab of candy anywhere from several feet in width to ten, twenty or thirty feet in length and supported on a table or board 2 on which the candy was poured, leveled out and cooled against marginal bars which were removed leaving a wide margin 2' on the board all around the candy.

In practice the board is first covered with a sheet of oiled paper before pouring the candy upon it so the slab will not stick to the board, but this is not shown in the drawings.

Secured to the under side of the board are cross braces or battens 3 to stiffen it, and secured to the battens are ball casters 4 rollable along channel iron guides or tracks 5. The tracks are secured to fixed framing 6 so that the candy board, or succession of boards, may be rolled along.

The cutting machine proper extends across the tracks so that the slab boards may be rolled under it to cutting position, and it consists of a frame comprising a pair of heavy steel beams or channels 7 connected by cross members 7' at the ends and supported just above the top of the candy slab by suitable framing 8.

Between beams 7 is a set of gang knives 9 adapted to be dragged over the candy slab when the board is positioned below.

These knives comprise flat apertured blades 9 carried on two bars 10 and spaced by pipe spacers 11 all clamped together by nuts 12 so that the assembly may be handled as a unit for placing into the machine, as assemblages of different knife spacing are used for different sizes of candy bars.

The knife assemblage is carried on endless chains 13 running the length of the machine and passing over sprockets 14 carried on shafts 15. The upper runs of chain are supported on tracks 16 secured to the beams, and the lower runs are supported between tracks 17, 18 secured to the beam, so that the knives will be held down to their work.

To support the knife assembly on the chains two spaced bars 19, 20 extending transversely of the machine are secured at their ends to the chain links and mounted on these bars adjacent each chain is a vertical plate 21, the plates being slotted as at 22 for one of the bars so as to provide for the changing chordal distance between the bars in rounding the sprockets, and plates 21 are slotted as at 23, 24 to receive bars 10 of the blade assembly, the slots being slanted backwards or opposite to the direction or travel of the plates when the chains are in motion, and slot 23 is also hooked backwardly as shown at 23' in Fig. 4 so that the drag of the candy on the knives will only tend to seat the bars better in the slots in case the nuts 25 at the ends of the bars are not tightly clamped to plates 21.

By the construction described a knife assembly is dropped into place on plates 21 when they are on the upper run of chain and the nut 25 tightened against the plates. On account of the angular slots it is necessary to enter the bar in slot 23 and thence to 23' before entering the other bar into slot 24.

The chains are actuated by means of an electric motor 26 coupled to a reduction gear 27 in turn belted or geared to the forward sprocket shaft of the machine as indicated.

The lower side of tracks 18 are planed true to provide a flat surface against which the margins 2' of the board are clamped when cutting the slab, the clamping of the board being effected by any means which will lift the board from the tracks and force it against the frame of the machine.

The means for lifting the board found serviceable comprises a set of pivoted toggle levers 28, 29 which may be straightened by means of any suitable operating device such for instance as the hand lever 30 preferably stabilized in either elevated or lowered position by any suitable means such for instance as an overbalancing weight 31.

In operation the board 2 is rolled along its tracks to aligned position under the cutting machine, the toggles are straightened to lift the board from the tracks and clamp it to the under side of the frame, the motor is started and the chains carry the knives to the rear end of the machine on the upper run of chains, thence around the sprockets to return on the lower run with the corners of the blades dragging through the candy to a depth determined by the angular setting of the blades or their length. When the length of the slab has been traversed by the blades they are carried upwardly over the forward sprocket, the motor is shut off, table lowered to the tracks and rolled beyond the cutting machine to make way for another board.

The travel of the knives is very rapid, consuming only a few seconds for a twenty-five foot slab of candy, and the speed combined with the dragging blades overcomes any tendency of the fudge type of candies to build up on the blades as is the common trouble with rotary gang cutters.

We claim:

1. A candy cutting machine comprising an elongated frame, a cutter carriage, means whereby the cutter carriage may be moved along the machine, a knife on the carriage extending downwardly, and means for raising and clamping a candy slab under said frame adjacent said knife.

2. A candy cutting machine comprising an elongated frame, a cutter carriage, means whereby the cutter carriage may be moved along the machine, a knife on the carriage extending downwardly, tracks extending transversely under the machine, a candy slab board rollable along said tracks, means for raising the board from the tracks and clamping it to the under side of the frame whereby the slab will be in position for cutting with said knife.

3. In a structure as specified in claim 2 the last mentioned means comprising a plurality of pivoted levers adapted to engage the under side of the board, means for simultaneously actuating the levers.

4. In a cutting machine of the character described, an elongated frame, a sprocket revolvably supported at each end of the frame, a spaced pair of endless chains passing around the sprockets, a plurality of spaced knife blades carried by the chains and with the planes of the blade parallel with the chains and means for actuating the chains to move around said sprockets to cut a series of strips parallel with the chains.

5. In a candy cutting machine of the character described, a plurality of knife blades, a pair of bars passing through said blades, and a carrier for supporting said blades comprising a pair of endless chains, wheels over which said chains extend, bars extending between said chains, plates on said bars slotted to receive the bars passing through said blades.

6. In a candy cutting machine of the character described, a plurality of knife blades, a pair of bars passing through said blades, and a carrier for supporting said blades comprising a pair of endless chains, wheels over which said chains extend, bars extending between said chains, plates on said bars slotted to receive the bars passing through said blades, and nuts on the last mentioned bars for clamping to said plates.

ANDREW OLSEN, Jr.
JAMES A. OLSEN.